United States Patent

[11] 3,577,566

[72] Inventors Benjamin Kislin;
J. W. Miller, San Antonio, Tex.
[21] Appl. No. 777,791
[22] Filed Nov. 21, 1968
[45] Patented May 4, 1971
[73] Assignee The United States of America as represented by the Secretary of the Air Force

[54] SPECTACLE HOOD
1 Claim, 5 Drawing Figs.

[52] U.S. Cl. .................................................. 2/12, 351/44
[51] Int. Cl. .................................................. A61f 9/04, G02c 7/16
[50] Field of Search ........................................... 351/41, 44—49, 57, 58, 55; 2/12, 13

[56] References Cited
UNITED STATES PATENTS

| | | | |
|---|---|---|---|
| 1,206,135 | 11/1916 | Otte ........................... | 351/145 |
| 1,605,418 | 11/1926 | Wittkopf ..................... | 351/46 |
| 2,870,446 | 1/1959 | Mitchell ...................... | 351/44XR |
| 3,268,228 | 8/1966 | Novack ....................... | 351/46UX |
| 3,421,233 | 1/1969 | Gaal ............................ | 351/45X |

*Primary Examiner*—David Schonberg
*Assistant Examiner*—John W. Leonard
*Attorneys*—Harry A. Herbert, Jr. and Arsen Tashjian

ABSTRACT: A spectacle hood having an opaque front with an appropriate cutout section conforming to the configuration of the cowl above an aircraft instrument panel. The device is held in place on the face by spectacle temples and peripheral vision is excluded by flexible sideshields. Where individual corrective lenses are required, the proper prescription can be incorporated in the clear area of the device.

PATENTED MAY 4 1971 3,577,566

INVENTORS
BENJAMIN KISLIN
J. W. MILLER
BY Harry A. Herbert Jr
Arsen Tashjian
ATTORNEYS

SPECTACLE HOOD

BACKGROUND OF THE INVENTION

This invention relates to an optical device having spheroidal opaque shields contoured to engage and be supported by the outer arcs of a spectacle frame and, more particularly, the invention is concerned with providing a spectacle hood for excluding the peripheral vision of the wearer while allowing visual observation of the instrument panel.

Heretofore, panels of opaque material were hung in front of the pilot undergoing instrument flight practice in jet trainer aircraft. This arrangement which is designed to block the cowl area above the instrument panel also obscures the view of the pilot by an outside observer and creates a potentially dangerous situation. Other apparatus, such as polarized panels and glasses, bill-cap-suspended opacities, and helmet-supported protruding blinders are sometimes used for the purposes of blocking the pilot's view of areas other than the instrument panel. These last named prior art devices are likewise expensive, uncomfortable and relatively unsafe when put to use in instrument flight training. Ideally, a device which is easily donned and removed such as a spectacle hood would provide a safe means for observing the pilot while training and also, would be a personalized item that is inexpensive to manufacture and comfortable to wear.

SUMMARY OF THE INVENTION

The present invention provides a spectacle hood which includes an opaque front supported by the nose and held on the head by temples. Appropriate segments are shaped to permit individual observation of aircraft instruments. Peripheral view is excluded by sideshields of flexible material. The occluding front is curved to permit eyelash clearance and facial contact at about brow level.

Spectacle correction wearers can be provided with standard ophthalmic mounting frames whose eyewires contain an opaque upper section and properly shaped clear segments corresponding to aircraft instrument contour arrangement. Sideshields are also incorporated and lens elements can be provided by appropriate powered glass or plastic with the upper portion opaqued by black paint or other such material.

Accordingly, it is an object of the invention to provide a spectacle hood which is easily donned and removed for permitting an aircraft pilot to observe the instrument panel of the aircraft while obscuring substantially all other vision within the without the aircraft.

Another object of the invention is to provide a spectacle hood having an opaque front with an appropriate cutout section. The opaque front conforms to the configuration of the cowl above the instrument panel while the cutout section allows the pilot to see the instrument panel itself.

Still another object of the invention is to provide a spectacle hood which is held in place on the face by spectacle temples and includes flexible sideshields to exclude peripheral vision of the wearer.

A further object of the invention is to provide a spectacle hood adaptable for use by individuals requiring corrective lenses by incorporating the prescription in the cutout area of the device.

A still further object of the invention is to provide an inexpensive, personalized, comfortable spectacle hood for instrument flight training.

Another further object of the invention is to provide an instrument flying device wherein the view of the pilot trainee by an outside observer is not obscured thereby providing a greater safety factor.

These and other objects, features, and advantages will become more apparent after considering the description that follows taken in conjunction with the attached drawings wherein like numbers are used throughout to refer to like elements.

DESCRIPTION OF A PREFERRED EMBODIMENT

Figure 1:
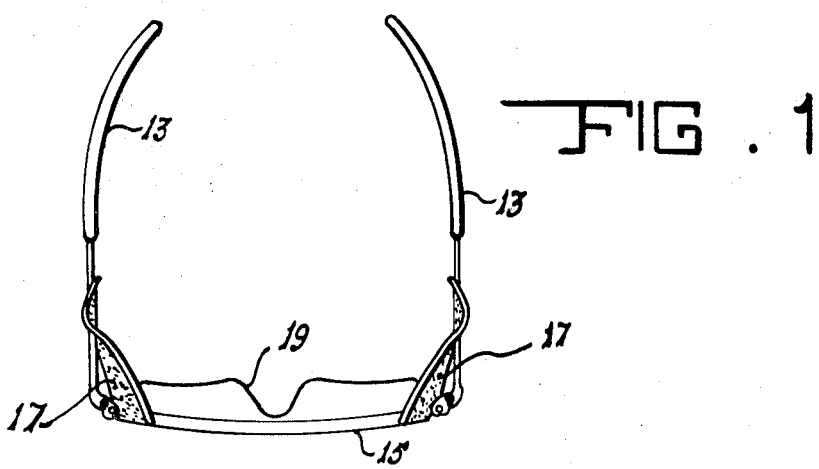
FIG. 1 is an overhead view of a clear version of a spectacle hood showing the spatula-type temples and opaque sideshields.
Figure 2:
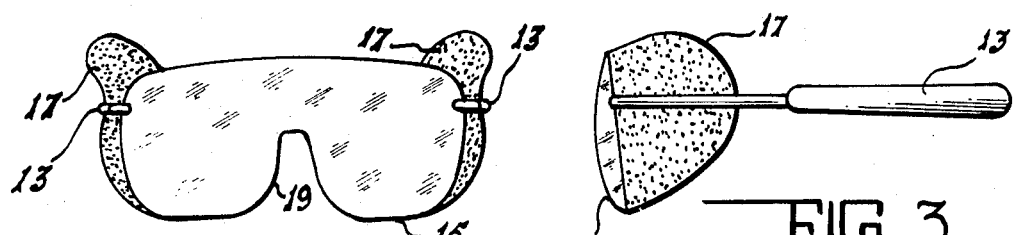
FIG. 2 is a front view of the spectacle hood of FIG. 1.
Figure 3:
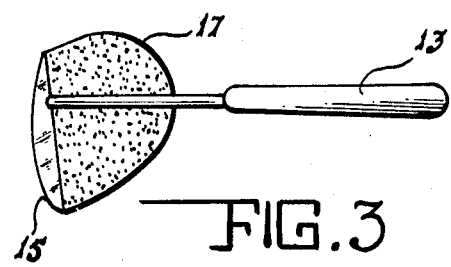
FIG. 3 is a side view of the spectacle hood of FIG. 1.

Referring now to the FIGS. 1—3, there is shown a spectacle hood having spatula-type temples 13 attached to a clear contoured plastic front 15. The temples 13 are hingedly connected to the plastic front 15 in accordance with conventional practice. Also attached to the plastic front 15 are a pair of opaque sideshields 17 fabricated of a flexible material and serving to exclude peripheral view of the wearer. A notch 19 is provided in the plastic front 15 to engage the nose of the wearer and support the front section of the spectacle hood.

The plastic front 15 preferably is formed from a sheet of suitable synthetic resin resulting in a clear, transparent material of suitable thickness so as to maintain the shape which is imparted by the blanking and die-stamping operations. Provisions are made in the front 15 to permit eyelash clearance and facial contact at about brow level. Preferably, the material selected for the blanked patterns should be relatively stiff and adapted to be painted or coated with some opaque material.

Figure 4:
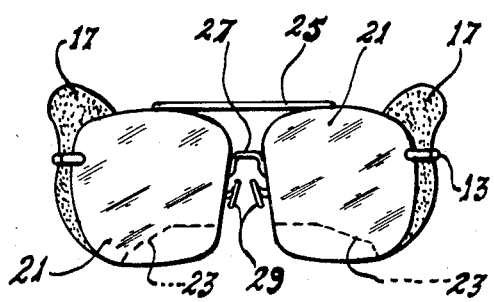
FIG. 4 shows an embodiment of the invention wherein corrective spectacles are modified to include the outline corresponding to the instrument section of the aircraft with the pilot in proper position for instrument flight.

In FIG. 4 there is shown an embodiment of the invention wherein corrective spectacle lenses 21 are provided with the outline 23 shown as a dotted line corresponding to the instrument section of the aircraft. In practice, the frame portion 25 retains the lenses 21 in position while the nose bridge 27 and nose pads 29 serve to support the spectacles on the wearer's face. The area of the lenses 21 above the dotted line 23 would be opaqued so that only the area below would allow the passage of light. This area may be powered glass or plastic to produce a corrective segment so that the proper correctional lens properties may be applied to compensate for distortions in the vision of the wearer.

Figure 5:
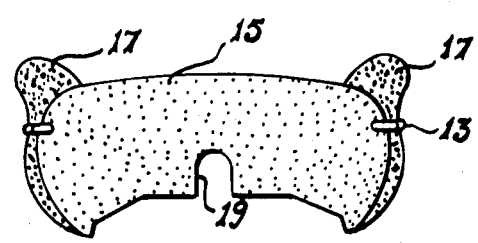
FIG. 5 is a spectacle hood according to the invention showing the opaque front contoured to the individual aircraft and pilot position.

In FIG. 5 there is shown a finished spectacle hood produced from the clear models shown in FIGS. 1—3. The lower section is contoured to correspond to the individual aircraft and pilot position. The proper configuration for the particular aircraft instrument arrangement and sitting position of the pilot is obtained by using a clear version of the spectacle hood and outlining the desired shape with grease pencil. The final opaque model as shown in FIG. 5 is obtained by transference of the outline to the final item. Sideshields 17 are also incorporated to exclude peripheral vision making the device especially useful by pilots in any aircraft where instrument flight practice is carried on.

Although the invention has been illustrated in the accompanying drawings and described in the foregoing specification in terms of preferred embodiments thereof, the invention is not limited to these embodiments or to the particular configurations mentioned. It will be apparent to those skilled in the art that our invention can be used efficiently with various other types of spectacles or goggles and that our invention is useful in other situations where it is desired to limit the view of the individual wearer to a particular limited area or field of vision. Also, it should be understood that various changes, alterations, modifications, and substitutions, particularly with respect to the construction details, can be made in the arrangement of the several elements without departing from the true spirit and scope of the appended claims.

We claim:

1. A spectacle hood for limiting the vision of the wearer to an aircraft instrument panel of specified configuration, said spectacle hood comprising a single opaque sheet of resin having temple bars extending rearwardly therefrom, said opaque sheet of resin extending vertically downward in front of and proximate the eyes of the wearer, a shaped opening in the lower central portion of said opaque sheet to allow the nose of the wearer to project therethrough, the lower edge of said shaped sheet of resin corresponding to the outline of the upper edge of the instrument panel of the aircraft such that only the aircraft instrument panel itself becomes visible to the wearer by looking through the area beneath the lower edge of said spectacle hood, the other vision of the wearer being blocked by said opaque sheet of resin, and a pair of sideshields of opaque material attached to the outer edges of said opaque sheet of resin, said sideshields operating to block the peripheral vision of the wearer.